R. E. JOYCE.
POWER TRANSMITTING MECHANISM FOR MOTOR VEHICLES.
APPLICATION FILED MAR. 15, 1920.
1,390,716. Patented Sept. 13, 1921.
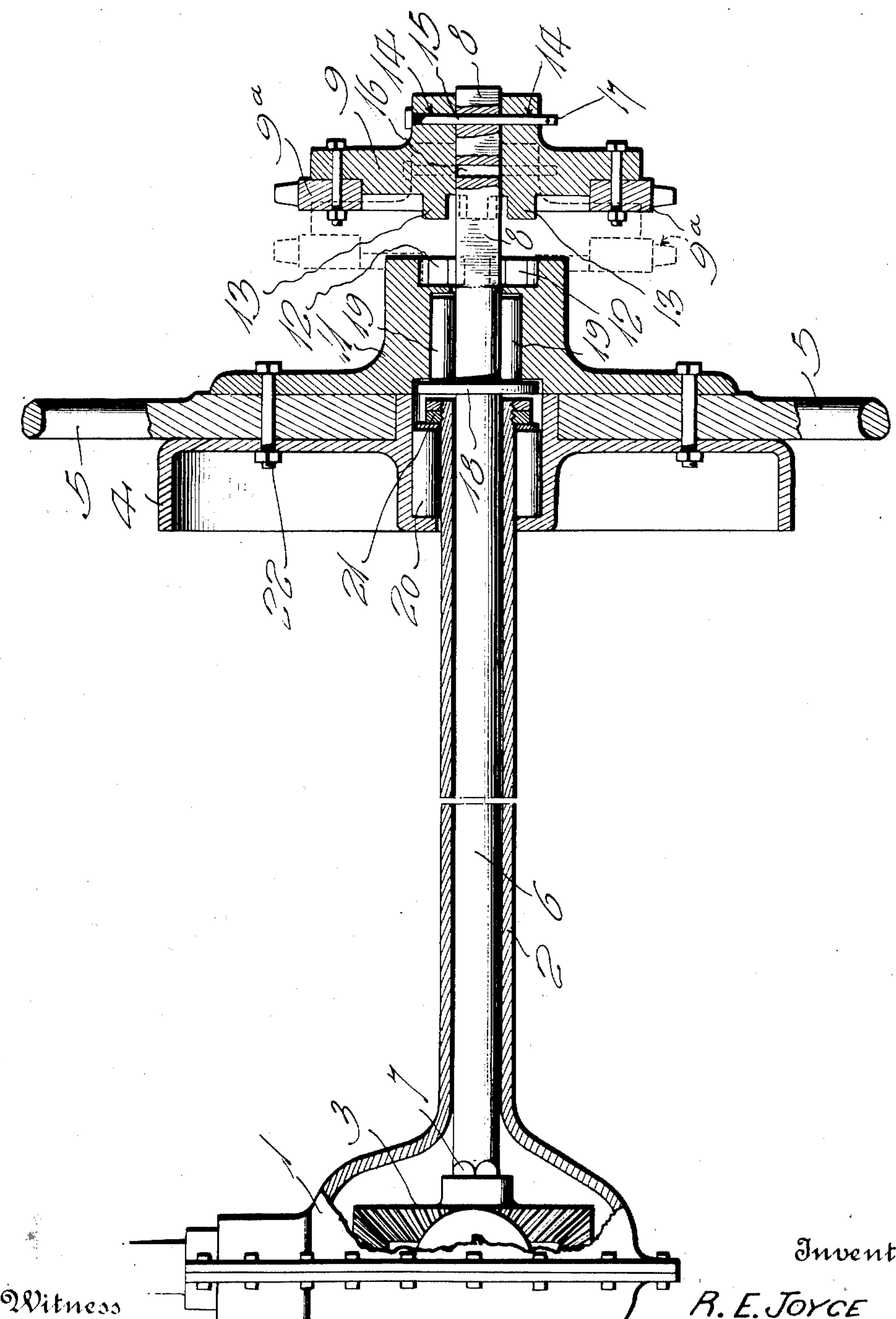
Witness
H. Woodard
Inventor
R. E. JOYCE
By A. B. Willson & Co.
Attorneys

UNITED STATES PATENT OFFICE.

ROY E. JOYCE, OF BARTLESVILLE, OKLAHOMA.

POWER-TRANSMITTING MECHANISM FOR MOTOR-VEHICLES.

1,390,716. Specification of Letters Patent. Patented Sept. 13, 1921.

Application filed March 15, 1920. Serial No. 365,845.

*To all whom it may concern:*

Be it known that I, ROY E. JOYCE, a citizen of the United States, residing at Bartlesville, in the county of Washington and State of Oklahoma, have invented certain new and useful Improvements in Power-Transmitting Mechanism for Motor-Vehicles; and I do declare the following to be a full, clear, and exact description of the invention, such as will enable others skilled in the art to which it appertains to make and use the same.

This invention relates to motor vehicles, and more particularly to an improved power transmitting mechanism for motor vehicles.

One object of this invention is to generally improve upon devices of this character by providing an improved vehicle-driving mechanism in which the driving axle can be quickly and easily thrown in and out of gear with one of the vehicle's driving wheels or ground wheels, and in which the supplemental driving wheel is rotatable independently of the vehicle-driving wheels while the latter are at rest and support the other parts of the vehicle.

Other objects and advantages will be pointed out or implied in the following details of description in connection with the accompanying drawings in which:—

The single figure represents a portion of a gear-casing, a portion of a shaft-casing, a portion of a ground-wheel and a portion of a brake-drum of a motor-vehicle, these portions being shown mainly in section, so that the construction and arrangement of the above mentioned elements are clearly visible in connection with the power transmitting wheel or element associated therewith.

The reference characters on the drawing agree with those in the following description. The gear casing 1, a driving-shaft-casing 2, the differential gearing 3, the brake-drum 4 and the part formed integrally therewith, and the spokes 5 may be of any ordinary and preferred construction, provided that they are capable of properly combining with the other elements of my invention which will now be described in detail:

A driving axle 6 is provided with a square or non-cylindrical inner end 7, and a square or non-cylindrical outer end 8, the end 7 being fitted into a square socket of the differential gearing 3 so as to be rotated by this differential gearing. The squared outer end 8 has a sprocket wheel or transmission element 9 fitted thereon, the latter being provided with a central aperture of a shape to conform to the non-cylindrical end 8 so as to be rotated by said axle 6. This wheel may comprise a removable working section 9ª which may be secured in place by bolts, as shown, or by any appropriate means, and may be replaced by other forms of gearing such as belt pulleys, cable-sheaves, etc. In this connection, it should be understood that the purpose of this transmission element 9 is to drive different kinds of machines other than the automobile which carries it, also to drive the automobile after being disengaged from the other machine which it has been driving.

In addition to the members 4 and 5, the wheel comprises a member 11 which is formed with lugs or clutch elements 12, and the member 9 is provided with corresponding clutch elements 13 which interlock with the clutch elements 12. In order to secure the clutch elements 12 and 13 in and out of locking engagement, the supplemental driving wheel or transmission element 9 is provided with a radial aperture 14, and the axle 6 is provided with radial or diametral apertures 15 and 16 which are adapted to register with the aperture 14 so as to receive a pin or bolt 17. When the bolt or pin 17 is in the position shown in full lines, the axle 6 can rotate while the ground-wheel remains stationary, and the ground-wheel now serves as a stationary bearing for the axle 6 to rotate within while driving the wheel 9. However, when the apertures 14 and 16 are in registration, and the pin 17 is seated in these registering apertures, the elements 9 and 9ª are in the dotted line position, and the clutch elements 12 and 13 are interlocked with one another so that the axle 6 and wheel 9 impart rotary motion to the ground-wheel and cause it to travel.

In order that the axle 6 cannot move longitudinally with relation to the ground-wheel, an annular flange 18 is provided, this flange being rigidly united with the axle 6. This flange 18 is disposed between and adjacent to the outer end of the casing 2 and the inner end portion of the wheel element 11. Roller bearings 19 are provided within the member 11, and roller bearings 20 are provided within the hub of the member 4. Through the medium of these latter roller bearings, the inner portion of the ground-wheel is journaled on the tubular casing 2; and through the medium of the roller bearings 19, the wheel element 11 is journaled on the axle 6, or rather, the axle 6 is journaled within the hub of the member 11. Mutually locking nuts 21 are fastened on the screw threaded end of the casing 2.

The member 11 is provided with an annular apertured flange through which bolts 22 extend, these bolts also extending through apertures in the member 4 to secure these members 4 and 11 in rigid relation to one another and to secure the spokes 5 in rigid relation with one another, when it is desired to replace or interchange spokes 5, it is done with comparative ease and facility by removing the pin 17 and the bolts 22 and then removing the members 9 and 11.

One very considerable advantage of this arrangement over the previously known arrangement of a supplemental wheel on the ground-wheel and rotatable therewith, resides in eliminating the time and labor involved in jacking up the ground-wheel. Moreover, the ordinary jack does not secure the wheel against horizontal movement, and the pull of a belt or chain on the element 9 constantly tends to dislodge the axle or its casing from the jack and it is accordingly necessary to employ a supplemental support. On the other hand, with the applicant's device, it is only necessary to move the transmission member 9 to the full line position, and place chucks in front and rear of the ground wheel, so that this ground wheel now provides a stationary and efficient bearing for the axle 6 to rotate within while carrying the transmission element 9.

It is not intended to limit this invention to the exact construction and arrangement shown, but changes may be made within the scope of the inventive idea as implied and claimed.

What I claim as my invention is:—

1. In a motor vehicle, a driving axle, a casing for the driving axle, a ground engaging wheel rotatable upon the axle casing and axle and held against movement longitudinally thereon, said wheel having a hub element extending outwardly and provided with clutch teeth, a power transmitting element slidable longitudinally upon the axle and held against rotation thereon and provided with clutch teeth for engaging the clutch teeth of the wheel, the axle having transversely extending openings in its outer end portion and the power transmitting element having openings for registering with the openings of the axle, and means for passing through alined openings of the axle and power transmitting element to releasably secure the power transmitting element in an adjusted position.

2. In a motor vehicle, a driving axle, a ground-wheel supporting said axle and having a hub provided with clutch teeth, and a power transmitting element having clutch teeth for engaging the clutch teeth of the wheel, the power transmitting element being secured against rotation relative to said axle and adjustable therealong into and out of locking engagement with said ground wheel, the driving wheel being rotatable by said power transmitting element when in said locking engagement, said ground wheel serving as a stationary bearing for the axle when the power transmitting element is out of locking engagement with the driving wheel.

3. In a motor-vehicle, a ground-wheel having clutch teeth, a driving axle journaled in said ground-wheel and having its outer end extending axially outward beyond the hub of said wheel, means to prevent longitudinal movement of said axle in said ground-wheel, a power transmitting element having clutch teeth for engaging the clutch teeth of the wheel, the power transmitting element being mounted for adjustment on and along the outward extension of said driving axle, and means to secure said transmitting element alternately in and out of operative engagement with said ground-wheel in such relation that the ground-wheel is alternately rotatable by said transmitting element and non-rotatable thereby while serving as a bearing for said axle while the latter rotates and drives said transmitting element.

4. In a motor-vehicle, a ground-wheel having its hub provided with two annular sets of roller-bearings, a tubular axle-casing including a journal on which one of said sets of bearings is journaled, a driving axle having a portion in said axle-casing and another portion journaled in the other one of said sets of roller bearings, a portion of this axle extending axially outward from said hub, an annular flange fixed on said axle and disposed between and adjacent to said axle-casing and the last mentioned set of roller bearings to prevent axial relative movement of said wheel and axle, a power transmitting element on the outwardly extended portion of said axle, and means associated with said axle and transmitting element and being operable to alternately fix and loosen said axle and transmitting element relative to said ground wheel.

In testimony whereof I have hereunto set my hand.

ROY E. JOYCE.